Patented July 18, 1944

2,353,918

UNITED STATES PATENT OFFICE 2,353,918

METHOD FOR PREPARATION OF TiO$_2$

Reginald Hill Monk, Montreal, Quebec, Canada, assignor to American Zinc, Lead & Smelting Company, St. Louis, Mo., a corporation of Maine No Drawing. Application September 3, 1941, Serial No. 409,430

11 Claims. (Cl. 23—202)

This invention pertains to a new and improved method for hydrolyzing TiO$_2$ from titanium salt solutions.

Hydrolysis occurs generally in titanium salt solutions as a result of a diminution of the acid content of the solution. In its simplest form, this diminution of the acid content is attained by diluting the solution with water. When the diminution of the acid content is relatively small, as in early U. S. patents, Nos. 1,189,229 and 1,409,648, it is necessary to subject the solution to a prolonged boiling.

Both of these methods are unsatisfactory because (a) the particles attain too large a size due to the normal effect of digestion on a precipitate, i. e., the growth of large particles at the expense of small ones, (b) the relatively high acid content is unfavorable to the growth of nuclei, and (c) the long boiling results in oxidation and precipitation of ferric hydroxide. As a result of these three elements there is a low yield of poor quality.

The necessary diminution of the acid content of the titanium salt solution has been attempted by the addition of basic substances to the solution. Many processes in the prior art depend wholly or in large part on this method. By this method an alkali is added to a portion or to the whole of the solution to be hydrolyzed to bring about the hydrolysis. If the alkali is added only to a portion of the solution the main hydrolysis is produced by transferring the initially hydrolyzed portion to the balance of the solution.

Another variation in the neutralizing method, similar in principle, lies in the addition of alkaline salts to the solution. Generally, the substances added are titanium derivatives of the alkalies or alkaline earths. These substances increase the titanium content with respect to the total acid content of the solution either by the neutralizing action of the alkaline salts added or, in part, by the production of TiO$_2$ as a result of chemical reaction.

It has also been suggested to add silicate, as a slight variation of this method with respect to the TiO$_2$ effect, as silicates are strongly similar to titanates.

An examination of the prior art discloses, therefore, that in the methods dealing with the hydrolysis of TiO$_2$ by various obvious variations in the manner of initiating and controlling the decomposition of the titanium salt solution, advantage is taken of the thermal instability of the solution in order to furnish sufficient nuclei to overcome the tendency to supersaturation of the solution and produce a yield of TiO$_2$.

I have determined that the control of the initial phases of the hydrolysis is the most difficult and the most essential step in the process. It is absolutely necessary exactly to control the precipitate first formed. At this stage impurities are most easily hydrolyzed in the low free acid content of the solution. As the hydrolysis proceeds, neutralization and dilution effects are secondary to thermal decomposition in a highly acid medium and under these conditions impurities usually occurring in TiO$_2$ are not precipitated.

The interrelation between thermal instability dilution and nuclear control by means of various added substances such as previously prepared TiO$_2$, silica, calcium sulphate or soluble organic salt, in a favorable hydrolysis process for the production of TiO$_2$ has not received the attention which its importance merits. Dilution and neutralization subject a titanium salt solution to a "shock" treatment. The sudden precipitation of TiO$_2$ from a solution containing numerous impurities, characteristic of crude titanium salt solutions, disturbs the stability of the other components of the solution. The fundamental problem, therefore, is a control of the hydrolysis in such manner that only the desirable components of the final pigment shall separate in solid phase from the solution and shall be isolated as pigment producing material.

Thermal instability, alone, does not produce sufficient nuclei to give a high yield as the rate of production of nuclei is small and diminishes as the acid concentration increases. Dilution, alone, produces numerous nuclei but they are of a poor quality. Attempts have been made to control the quality, in the dilution method, by adding soluble agents. Seeding with crude TiO$_2$ has been attempted, but, due to the presence of impurities, this seeding method has most of the disadvantages of pure dilution. Seeding with pure TiO$_2$ requires the preparation of a seed in large quantities from a purified titanium salt solution and results in higher cost with no increase in the control of particle size or of the initial phases of the hydrolysis. Seeding with added material has hitherto required too large a quantity of substances which detract from the purity of the final pigment and which affect the flexibility of the TiO$_2$.

I have carried out experiments for the past seven years which have emphasized the importance of control of the initial stage of the hydrolysis. Existing methods which involve a sharp reduction in the total acidity of the solution by neutralization or even by dilution alone, which involves a much more insignificant addition of hydroxyl ions than does any form of neutralization, do not afford adequate control of the pigmentary characteristics of the solid phase as it separates out of the hydrolyzing solution.

In U. S. Patent No. 2,028,292, control of the initial steps of the hydrolysis is facilitated by the addition of a protective colloid. In U. S. Patent No. 2,108,723, it is suggested to add the fluoride and oxalate of certain metals with a protective colloid to improve the quality of the final product and to increase the ease of control of the hydrolysis. These methods met with some success and led to an exhaustive investigation into the function of protective colloids and the substances just mentioned. It appeared possible to find substances which would function similarly to those added to the protective colloids and which would in addition obviate the necessity for the use of the protective colloids. This was found to be practical and economical and was further found to give a degree of control over the hydrolysis which was hitherto unattainable.

It was necessary, in attempting to find the suitable addition agent, to choose substances which would not have a deleterious effect upon the whiteness and brilliance of $TiO_2$, as a pigment. Of all the substances which would leave solid residues, and which would fulfill this requirement, I determined that the group comprising the metal-organic salts of the four elements cadmium, indium, tin and antimony is the only one which would give satisfactory results. These four elements occur, in series, in the list of elements by their atomic numbers 48, 49, 50 and 51. The desirable characteristics, which they evidence, are not shown by the other elements which are closely related to them above or below in the periodic table. For example, barium, strontium, zirconium and cerium are quite closely related to the four above listed elements in the periodic table, but give unsatisfactory results. It would therefore appear that the results obtained are a characteristic related horizontally in the periodic table. This relation is relatively rare as compared to the more common vertical relationship.

The metal-organic salts of the above mentioned elements which can subserve the desired function include, as a broad generic classification, metal derivatives of the di- or tri-carboxy acids having not more than six carbon atoms in any one straight or branch chain of the organic radical attached. Preference is given to those derivatives of the above mentioned metals which are insoluble in water.

These compounds, whether soluble or insoluble in water tend to be more or less rapidly decomposed by the acid liberated during the hydrolysis of the titanium salt solution. Each particle acts as a center or focal point of crystallization for particles of $TiO_2$ initiated by the slow reaction with the totanium salt and the consequent local (on a microscopic scale) neutralization of a few molecules at a time with the equivalent quantity of the oxide derived from the decomposing salt. The slow microscopic scale of the reaction at each individual particle of the metal-organic salt is apparently facilitated by the low basicity of these metal elements evidenced by their occurrence in a medium position in the vertical columns of the periodic table (basicity increasing from top to bottom) and by the relatively large size of the metal nucleus which results in a particle of a given weight containing less molecules of the re- acting weak metal base. Apparently, in the metals of this group, a favorable balance exists between decreasing basicity, going toward the right in the periodic table, and increasing valence and theoretical neutralizing power. It appears, however, that the efficacy of this method is, to a great degree, dependent upon the readiness with which these metal-organic derivatives are formed in a state of extremely fine dispersion. This characteristic appears to be specific to this particular group of metallic elements as opposed to the larger number of elements, i. e., aluminum and calcium, etc., which function to a lesser degree as initiators of nuclei in the hydrolysis of titanium salt solutions.

The characteristics of these substances lead to a degree of control of the hydrolysis, by a smaller amount of material, which is much greater than has been hitherto obtainable. The combination of the characteristics described is just enough slowly to overcome the stability of the titanium salt solution, resulting in the formation of exceedingly small particles. There is no occlusion of impurities or local precipitation of iron, usually caused by too drastic a degree of hydrolysis resulting from too rapid neutralization of the acid. The metastable equilibrium of the titanium salt, in aqueous solution, is disturbed just enough and no more and the hydrolysis proceeds slowly and steadily with the production of a maximum number of primary nuclei while the thermal treatment is causing a decrease in stability sufficient to allow a mass hydrolysis of the bulk of the solution upon the nuclei formed under the above controlled conditions.

Primarily, the invention comprises the addition to a relatively small proportion of water of approximately 2% of one of the metal-organic derivatives above mentioned, based on the $TiO_2$ content of the solution. This percentage is added without the benefit of a protective colloid, is less than half of the salt content added with a protective colloid, in U. S. Patent No. 2,108,723 to a similar solution. It results in complete and rigorous control of the hydrolysis and production of $TiO_2$ of extremely fine particle size which is readily filterable and of great opacity and brilliance after calcination.

An example of the process in accordance with the present invention is as follows: A concentrated solution of titanium sulphate is first prepared by lixiviation of sulphated cake derived from any titaniferous ore. After crystallization of a portion of the ferrous sulphate contained in the solution, it is of a specific gravity of approximately 1.45 and contains approximately 10% by weight of $TiO_2$ and 25% by weight of $H_2SO_4$. To a bath containing 250 c. c. of water is added 1.6 grams of a mutually precipitated mixture of titanium potassium fluoride and antimony oxalate. This bath is brought to a temperature of approximately 100° C. and to it is then added, under agitation and preferably at a uniform rate, during a period of about 15 minutes, approximately 200 c. c. of titanium sulphate solution containing 10% $TiO_2$. The temperature of this portion of the solution of titanium sulphate may vary considerably and room temperature is therefore convenient.

Hydrolysis resulting from the combining of these two solutions produces a large number of hydrated titanium dioxide particles to serve as "seed." There is then added very quickly approximately 800 c. c. of the same titanium sulphate solution, also at room temperature. The whole is now raised rapidly to boiling temperature. When the temperature reaches approximately 85° C. the added salt and the TiO₂ produced apparently dissolve and after boiling for approximately 10 minutes hydrolysis takes place gradually and completely, 95% of the total content of TiO₂ separating in solid phase from the hydrolyzing solution in approximately 30 minutes.

An exact quantitative theoretical explanation cannot be advanced to explain these results. The results, however, have been qualitatively described as a function of the position of the metals of these metal-organic derivatives among the elements together with a certain specificity pertaining to the elements themselves.

It is interesting to note that these four elements, cadmium, indium, tin and antimony, are elements whose oxides are white and soluble in the hydrofluoric acid, while the oxalates, which are desirable salts to employ as seeding agents, of all four elements are insoluble. Advantage can be taken of this fact, particularly in the case of antimony oxalate, which is unstable, by causing mutual precipitation to take place with a salt, the oxalate of which is soluble and the fluoride of which is insoluble. The double salts of titanium and potassium are among the very few which have these characteristics. Therefore, if a solution of the fluorides of these elements is added to a strong solution of titanium potassium oxalate, a mutual precipitation results, the resulting compound is stable and is highly suitable as an agent for the control of the particle size of TiO₂ during hydrolysis.

These substances and others of the generic group obtained directly and without grinding from the simple process of precipitation, are readily dispersed as a fine suspension in water. Upon addition of a portion of a titanium salt solution, to produce sufficient seeds required by any method involving the production of nuclear TiO₂, to a bath containing one or more of these metal-organic derivatives and a small quantity of water, the TiO₂ is first produced by dilution on top of the nuclei provided by the added solid. The solid added and the TiO₂ are of such characteristics that both are apparently dissolved for a time in the acid resulting from hydrolysis. Nevertheless, on further heating of the seed and the bulk of the solution to which it has been added, hydrolysis takes place gradually and completely.

This invention is susceptible of numerous changes and embodiments without departing from the spirit thereof. Attention is therefore directed to the appended claims for limiting its scope.

What is claimed is:

1. In a process for producing titanium dioxide by the hydrolysis of a titanium salt solution, the step of progressively adding, under agitation, a titanium salt solution maintained at a temperature below that of hydrolysis, to a bath maintained at a hydrolyzing temperature and containing a mutually precipitated mixture of insoluble salts comprising an insoluble double fluoride of titanium and potassium and an insoluble salt which is a member of the group consisting of the cadmium, indium, tin and antimony salts of the aliphatic di- and tri-carboxy acids having not more than six carbon atoms in any one straight or branched chain of the organic radical, said mixture having been prepared by double decomposition and mutual co-precipitation of a soluble titanium potassium double salt of one of said acids and a soluble fluoride of one of said metals.

2. In a process for producing titanium dioxide by the hydrolysis of a titanium salt solution, the step of progressively adding, under agitation, a titanium salt solution maintained at a temperature below that of hydrolysis, to a bath maintained at a hydrolyzing temperature and containing a mutually precipitated mixture of insoluble salts comprising an insoluble double fluoride of titanium and potassium and an insoluble salt which is a member of the group consisting of the cadmium salts of the aliphatic di- and tri-carboxy acids having not more than six carbon atoms in any one straight or branched chain of the organic radical, said mixture having been prepared by double decomposition and mutual co-precipitation of a soluble titanium potassium double salt of one of said acids and a soluble fluoride of cadmium.

3. In a process for producing titanium dioxide by the hydrolysis of a titanium salt solution, the step of progressively adding, under agitation, a titanium salt solution maintained at a temperature below that of hydrolysis, to a bath maintained at a hydrolyzing temperature and containing a mutually precipitated mixture of insoluble salts comprising an insoluble double fluoride of titanium and potassium and an insoluble salt which is a member of the group consisting of the tin salts of the aliphatic di- and tri-carboxy acids having not more than six carbon atoms in any one straight or branched chain of the organic radical, said mixture having been prepared by double decomposition and mutual co-precipitation of a soluble titanium potassium double salt of one of said acids and a soluble fluoride of tin.

4. In a process for producing titanium dioxide by the hydrolysis of a titanium salt solution, the step of progressively adding, under agitation, a titanium salt solution maintained at a temperature below that of hydrolysis, to a bath maintained at a hydrolyzing temperature and containing a mutually precipitated mixture of insoluble salts comprising an insoluble double fluoride of titanium and potassium and an insoluble salt which is a member of the group consisting of the antimony salts of the aliphatic di- and tri-carboxy acids having not more than six carbon atoms in any one straight or branched chain of the organic radical, said mixture having been prepared by double decomposition and mutual co-precipitation of a soluble titanium potassium double salt of one of said acids and a soluble fluoride of antimony.

5. A process for preparing TiO₂ from the hydrolysis of a titanium salt solution, which comprises forming a water dispersion of a mutually precipitated mixture of insoluble salts comprising an insoluble double fluoride of titanium and potassium and an insoluble salt which is a member of the group consisting of the cadmium, indium, tin and antimony salts of the aliphatic di- and tri-carboxy acids having not more than six carbon atoms in any one straight or branched chain of the organic radical, adding thereto a substantially equal volume of a titanium salt solution while agitating the mixture, allowing hydrolysis of this mixture to complete, adding thereto a larger volume of titanium salt solution, and maintaining the temperature of the mixture at boiling until hydrolysis is complete.

6. A process for preparing TiO₂ from the hydrolysis of a titanium salt solution, which comprises forming a water dispersion of a mutually precipitated mixture of insoluble salts comprising an insoluble double fluoride of titanium and potassium and an insoluble salt which is a member of the group consisting of the cadmium salts of the aliphatic di- and tri-carboxy acids having not more than six carbon atoms in any one straight or branched chain of the organic radical, adding thereto a substantially equal volume of a titanium salt solution while agitating the mixture, allowing hydrolysis of this mixture to complete, adding thereto a larger volume of titanium salt solution, and maintaining the temperature of the mixture at boiling until hydrolysis is complete.

7. A process for preparing TiO₂ from the hydrolysis of a titanium salt solution, which comprises forming a water dispersion of a mutually precipitated mixture of insoluble salts comprising an insoluble double fluoride of titanium and potassium and an insoluble salt which is a member of the group consisting of the tin salts of the aliphatic di- and tri-carboxy acids having not more than six carbon atoms in any one straight or branched chain of the organic radical, adding thereto a substantially equal volume of a titanium salt solution while agitating the mixture, allowing hydrolysis of this mixture to complete, adding thereto a larger volume of titanium salt solution, and maintaining the temperature of the mixture at boiling until hydrolysis is complete.

8. A process for preparing TiO₂ from the hydrolysis of a titanium salt solution, which comprises forming a water dispersion of a mutually precipitated mixture of insoluble salts comprising an insoluble double fluoride of titanium and potassium and an insoluble salt which is a member of the group consisting of the antimony salts of the aliphatic di- and tri-carboxy acids having not more than six carbon atoms in any one straight or branched chain of the organic radical, adding thereto a substantially equal volume of a titanium salt solution while agitating the mixture, allowing hydrolysis of this mixture to complete, adding thereto a larger volume of titanium salt solution, and maintaining the temperature of the mixture at boiling until hydrolysis is complete.

9. A process for preparing titanium oxide from the hydrolysis of a titanium salt solution, which comprises forming a water dispersion of a mutually precipitated mixture of titanium potassium fluoride and cadmium oxalate, and adding thereto a concentrated titanium salt solution.

10. A process for preparing titanium oxide from the hydrolysis of a titanium salt solution, which comprises forming a water dispersion of a mutually precipitated mixture of titanium potassium fluoride and tin oxalate, and adding thereto a concentrated titaninum salt solution.

11. A process for preparing titanium dioxide which comprises forming a water dispersion of a mutually precipitated mixture of titanium potassium fluoride and antimony oxalate and adding a concentrated titanium salt solution thereto.

REGINALD HILL MONK.